(12) United States Patent  (10) Patent No.: US 8,899,923 B2
Hancock  (45) Date of Patent: Dec. 2, 2014

(54) WIND TURBINE BLADE WITH DEVICE FOR CHANGING THE AERODYNAMIC SURFACE OR SHAPE

(75) Inventor: Mark Hancock, Southampton (GB)

(73) Assignee: Vestas Wind Systems A/S, Aarhus N. (DK)

( * ) Notice: Subject to any disclaimer, the term of this patent is extended or adjusted under 35 U.S.C. 154(b) by 798 days.

(21) Appl. No.: 13/123,809

(22) PCT Filed: Oct. 14, 2009

(86) PCT No.: PCT/EP2009/063400
§ 371 (c)(1),
(2), (4) Date: Aug. 23, 2011

(87) PCT Pub. No.: WO2010/043645
PCT Pub. Date: Apr. 22, 2010

(65) Prior Publication Data
US 2011/0293420 A1 Dec. 1, 2011

Related U.S. Application Data

(60) Provisional application No. 61/196,145, filed on Oct. 14, 2008.

(30) Foreign Application Priority Data

Oct. 14, 2008 (DK) .................. 2008 01435

(51) Int. Cl.
*F03D 1/06* (2006.01)
*F03D 7/02* (2006.01)
(52) U.S. Cl.
CPC .............. *F03D 1/0641* (2013.01); *F03D 1/065* (2013.01); *F03D 7/0232* (2013.01); *F05B 2240/31* (2013.01); *Y02E 10/721* (2013.01); *Y02E 10/723* (2013.01)
USPC ......................................... 416/23

(58) Field of Classification Search
CPC ... F03D 7/0232; Y02E 10/721; Y02E 10/723; F05B 2240/31; F05B 2240/311; F05B 2240/98
USPC .......... 416/240, 1, 23, 132 B, 142, 241 A, 87, 416/88
See application file for complete search history.

(56) References Cited

U.S. PATENT DOCUMENTS 2,108,245 A * 2/1938 Ash, Jr. ........................... 416/88
5,294,080 A * 3/1994 Ross .............................. 244/215

(Continued)

FOREIGN PATENT DOCUMENTS

EP     1 375 911      1/2004
WO   2004/099608   11/2004

(Continued)

OTHER PUBLICATIONS

International Bureau, International Preliminary Report on Patentability and Written Opinion of the International Searching Authority, PCT/EP2009/063400, Apr. 28, 2001, 6 pgs.

(Continued)

*Primary Examiner* — Edward Look
*Assistant Examiner* — Eldon Brockman
(74) *Attorney, Agent, or Firm* — Wood, Herron & Evans, LLP (57) ABSTRACT

The invention relates to a wind turbine blade comprising a device for modifying the aerodynamic surface or shape of the blade in an area of the trailing edge, and activation mechanisms for controlling the position and/or movement of the device. The device is at least partly divided into a number of sections by interstices or connecting portions having a higher elasticity. Hereby the overall longitudinal bending flexibility of the device is increased which in turn increases the operability of the aerodynamic device and reduces the wear of the system. The interstices may be open, comprise a filler material, or optionally be covered by an elastic film.

14 Claims, 4 Drawing Sheets

(56) References Cited

U.S. PATENT DOCUMENTS

| | | | |
|---|---|---|---|
| 6,145,791 A | 11/2000 | Diller et al. | |
| 6,752,595 B2 * | 6/2004 | Murakami | 416/87 |
| 6,869,050 B1 | 3/2005 | Burchard | |
| 6,966,758 B2 * | 11/2005 | Grabau et al. | 416/229 R |
| 7,083,383 B2 | 8/2006 | Loftus et al. | |
| 7,131,812 B2 * | 11/2006 | Brueckner | 415/4.3 |
| 7,204,674 B2 * | 4/2007 | Wobben | 416/1 |
| 7,293,959 B2 * | 11/2007 | Pedersen et al. | 416/23 |
| 7,381,029 B2 * | 6/2008 | Moroz | 416/132 B |
| 7,384,016 B2 | 6/2008 | Kota et al. | |
| 7,445,431 B2 * | 11/2008 | Larsen et al. | 416/1 |
| 7,467,921 B2 * | 12/2008 | Greenblatt | 416/1 |
| 7,632,068 B2 * | 12/2009 | Bak et al. | 416/23 |
| 7,946,803 B2 * | 5/2011 | Wobben | 415/4.3 |
| 8,128,361 B2 * | 3/2012 | Dawson et al. | 416/1 |
| 8,157,533 B2 * | 4/2012 | Godsk et al. | 416/240 |
| 8,162,607 B2 * | 4/2012 | Grohmann et al. | 416/23 |
| 8,251,656 B2 * | 8/2012 | Stiesdal | 416/23 |
| 8,267,654 B2 * | 9/2012 | van Dam et al. | 416/14 |
| 8,317,479 B2 * | 11/2012 | Vronsky et al. | 416/196 R |
| 8,408,870 B2 * | 4/2013 | Rebsdorf et al. | 416/23 |
| 8,517,682 B2 * | 8/2013 | Hancock | 416/23 |
| 2004/0105752 A1 * | 6/2004 | Wobben | 415/4.1 |
| 2007/0036653 A1 * | 2/2007 | Bak et al. | 416/98 |
| 2009/0028705 A1 * | 1/2009 | Meldgaard et al. | 416/23 |
| 2009/0246033 A1 * | 10/2009 | Rudling | 416/241 A |
| 2009/0269198 A1 * | 10/2009 | Grohmann et al. | 416/23 |
| 2009/0284016 A1 * | 11/2009 | van Dam et al. | 290/54 |
| 2009/0290982 A1 * | 11/2009 | Madsen et al. | 416/61 |
| 2010/0143130 A1 * | 6/2010 | Cairo | 416/84 |
| 2010/0260603 A1 * | 10/2010 | Dawson et al. | 416/87 |
| 2011/0084174 A1 * | 4/2011 | Hemmelgarn et al. | 244/200 |
| 2011/0217167 A1 * | 9/2011 | Hancock et al. | 416/23 |

FOREIGN PATENT DOCUMENTS

| | | |
|---|---|---|
| WO | 2007/045940 | 4/2007 |
| WO | 2008/003330 | 1/2008 |

OTHER PUBLICATIONS

Sven Nytoft Rasmussen; Search Report issued in priority Denmark Application No. PA 2008 01435; May 18, 2009; 2 pages; Danish Patent and Trademark Office.

Chava Jucker; Search Report and Written Opinion issued in priority International Application No. PCT/EP2009/063400; Apr. 28, 2010; 12 pages; European Patent Office.

* cited by examiner

WIND TURBINE BLADE WITH DEVICE FOR CHANGING THE AERODYNAMIC SURFACE OR SHAPE

FIELD OF THE INVENTION

The present invention relates to the field of rotor blades for wind turbine installations. In particular, it relates to means for adjusting and modifying the aerodynamic surface and shape of the wind turbine blade.

BACKGROUND

Most modern wind turbines are controlled and regulated continuously during operation with the purpose of ensuring optimal performance of the wind turbines in all operating conditions, such as at different wind speeds or subject to different demands from the power grid. Desirably, the wind turbine can also be regulated to account for fast local variations in the wind velocity—the so-called wind gusts. Also, as the loads on each of the blades vary due to e.g. the passing of the tower or the actual wind velocity varying with the distance to the ground (the wind profile), the ability to regulate each of the wind turbine blades individually advantageously enables the loads to be balanced, reducing the yaw and tilt of the rotor.

A well-known and effective method of regulating the loads on the rotor is by pitching the blades. However, with the increasingly longer blades on modern wind turbines (which at present can be of 60 m or longer) pitching becomes a relatively slow regulation method incapable of changing the blade positions fast enough to account for e.g. wind gusts or other relatively fast load variations.

Another way of regulating the blades is by changing their aerodynamic surfaces or shapes over parts or the entire length of the blade, thereby increasing or decreasing the blade lift or drag correspondingly. Different means of changing the airfoil shape are known such as active trailing edges, or different types of movable or adjustable flaps (e.g. trailing edge flaps, leading edge slats or Krueger flaps, ailerons, or stall inducing flaps). Such different means are here and in the following referred to in common as aerodynamic devices or devices for modifying the aerodynamic surface or shape of the blade. One important advantage of the relatively small aerodynamic devices is a potentially faster response due to less inertia than if the whole blade is being pitched.

In order to obtain the desired regulation of the blades, the flaps or active trailing edges often extend over considerable lengths of the blade and are traditionally actuated or moved in a chordwise plane transverse to the length of the blade. However, known systems may exhibit considerable power consumption during operation and problems with their operational speed. Moreover, known systems are generally exposed to hard wear and corresponding relative short lifetime and durability.

DESCRIPTION OF THE INVENTION

It is therefore an object of embodiments of the present invention to overcome or at least reduce some or all of the above described disadvantages of the known wind turbine blades comprising devices for modifying its aerodynamic surface or shape. Moreover, it is an object of embodiments of the present invention to provide simple, reliable, and more durable solution for aerodynamic devices of a wind turbine blade.

In accordance with the invention this is obtained by a wind turbine blade comprising a blade body extending in a longitudinal direction from a root portion to a tip portion and defining an aerodynamic airfoil cross section extending in a chordwise direction transverse to the longitudinal direction. The wind turbine blade further comprises one or more devices for modifying the aerodynamic surface or shape of the blade in an area of a portion of the trailing edge of the blade, and one or more activation mechanisms for controlling the position and/or movement of the device. The device is movably connected to the blade body and is at least partly divided into a number of sections by interstices or connecting portions having higher elasticity than the sections, the interstices or connecting portions extending at least partly through a thickness of the device from a trailing edge of the device and in the chordwise direction, such that the overall longitudinal bending flexibility of the device is increased.

By having the device for modifying the aerodynamic surface or shape of the blade divided into a number of sections is obtained that the ability of the device to bend and flex is considerable increased. As the devices are very often hinged or in another way fastened to the blade body along a considerable part of their length, the increased overall longitudinal bending flexibility of the device results in less resistance towards the activation and movement of aerodynamic device. This in turn results in lower forces and power consumption in the system and less friction and wear in the movable parts of the blade increasing the longevity of the device, any connection elements to the blade body and the activation mechanisms. The construction of the aerodynamic device further results in the longitudinal bending modes of the blade and the device to decouple to a larger extent from the transverse bending modes. Furthermore, the modular nature of the construction allows a wider range and more efficient manufacturing methods for example thermoplastic moulding, and for easier maintenance where individual modules can be replaced or refurbished. Smaller modules may more readily be upgraded in a maintenance overhaul to later versions of the device.

In an embodiment of the invention the interstices are arranged at essentially even intervals along the longitudinal direction of said device. Hereby is obtained an increase in the bending and twisting of the aerodynamic device along its entire length and corresponding higher ability to follow the blade deformations whereby the frictional forces in joints and connection parts and activation mechanisms may be reduced.

In an embodiment of the invention the interstices or connecting portions extend through the entire chordwise width of said device increasing the flexibility of the aerodynamic device correspondingly. Further is obtained, that the aerodynamic device may be assembled by the number of sections being premanufactured. The device can optionally be assembled during connection to or mounting on the wind turbine blade body.

In a further embodiment of the invention the one or more connecting portions comprise an elastic filling material such as e.g. an elastomeric material, a plastic foam material, an inflated seal, and/or a stretched elastic skin. The elastic filling material may be configured to form an essentially smooth surface of the device. Hereby can be obtained an aerodynamic surface where the fluid flow is minimally disrupted by the interstices while at the same time reducing the overall stiffness of the device. Further the filling material is advantageous in helping to seal fully or partially the interior parts of the aerodynamic device or the blade body preventing dust particles or fluid from entering.

In a further embodiment of the invention the one or more devices for modifying the aerodynamic surface or shape of the blade comprise one or more elastic films which at least partly cover the interstices or connecting portions. The advantages hereof are as mentioned above for the elastic filling material. Further, the elastic film can in one embodiment be applied to the device by embedding the device in the elastic film during manufacture.

In a further embodiment of the invention neighboring device sections at least partly overlap in the relaxed state of the blade whereby the advantageous increased flexibility of the aerodynamic device is achieved in a simple way without the use of any other materials. By "relaxed state" is meant when the wind turbine is not in operation and the blade is not rotataing.

In an embodiment of the invention the activation mechanisms for controlling the position and/or movement of the devices comprise an actuator and/or a pressure chamber.

In an embodiment of the invention the activation mechanisms for controlling the position and/or movement of the devices comprise one or more pressure hoses which are positioned essentially in the longitudinal direction of the device. Hereby is obtained an effective control mechanism allowing for a faster activation of the aerodynamic device and which can easily be arranged in conjunction with the device. The use of pressure as an activating medium is furthermore advantageous in that electrical wires in the blades (with their increased risks of damage due to lightning) can thereby be avoided. The described pressure hose system is furthermore advantageous in being of low weight and of low manufacturing cost.

In a further embodiment of the invention the blade body has a trailing edge and the device is attached to a trailing edge of the blade body, said device being a trailing edge flap and a trailing edge of the flap forms at least part of the trailing edge of the wind turbine blade. In this configuration, the device is a trailing edge flap which can deflect upwards or downwards. The flap may be connected by a hinge to the blade body or it may be a deforming trailing edge.

Further said trailing edge flap may comprise a pressure skin and a suction skin and the interstices or connecting portions extend through a thickness of the flap between the pressure skin and the suction skin. Hereby, the trailing edge flap has a pressure skin and a suction skin and these surfaces may be continuous with a pressure skin and a suction skin of the blade body. In a further embodiment of the invention a first one of the pressure and suction skins is secured to or integral with the blade body, and a second one of the pressure and suction skins is slidably movable with respect to the blade body. Hereby may be obtained an essentially smooth surface of the blade during all or most of the regulation positions of the device.

Further, a part of the second one of the pressure and suction skins which is slidably movable with respect to the blade body may in another embodiment comprise a radial surface arranged such that it is rotatable about a hinge. This construction allows for an essentially smooth and continuous surface of the blade over the connection between the blade body and the movable device irrespective of or during large portions of the device movement. Further, the construction may reduce the risk of dust, water etc entering any inner parts of the device or the blade.

The invention finally relates to a wind turbine comprising at least one wind turbine blade according to any of the embodiments described in the preceding. Advantages hereof are as described above for the wind turbine blade.

BRIEF DESCRIPTION OF THE DRAWINGS

In the following different embodiments of the invention will be described with reference to the drawings, wherein.

DETAILED DESCRIPTION OF THE DRAWINGS

Figure 1:
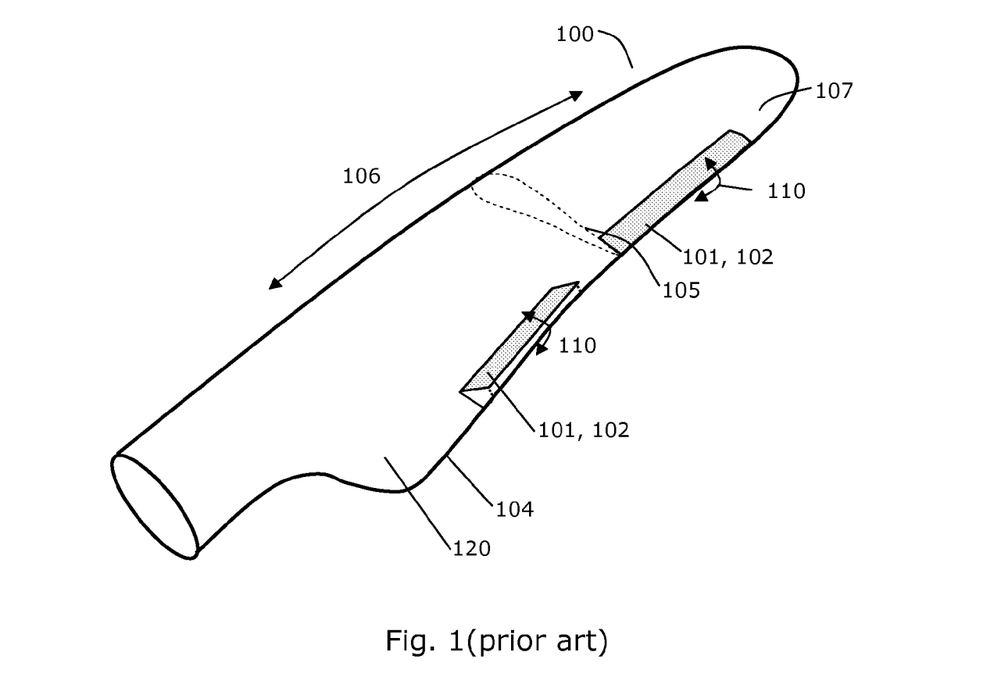
FIG. 1 shows a wind turbine blade according to prior art and comprising movable aerodynamic devices in the shape of a movable trailing edge and an aileron, FIGS. 2A, B, and C shows a wind turbine blade according to prior art in a cross sectional view with different types of movable aerodynamic devices.

FIG. 1 shows a blade 100 for a wind turbine according to prior art and comprising some examples of so-called aerodynamic devices 101. When manipulated, the aerodynamic devices change or modify the aerodynamic surface or shape 105 of the wind turbine blade 100 thereby altering the lift and/or drag coefficients of the wind turbine blade during operation. In the examples illustrated in this figure, the aerodynamic shape of the wind turbine blade 100 can be changed and regulated by changing the position of the movable trailing edge flap 102 placed along a part of the length or longitudinal direction 106 of the blade, or by the activation of a number of ailerons 103 also placed near and along the trailing edge 104 of the wind turbine blade on its suction side.

Figure 2A:
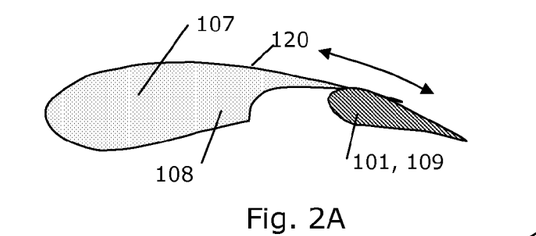
Figure 2B:
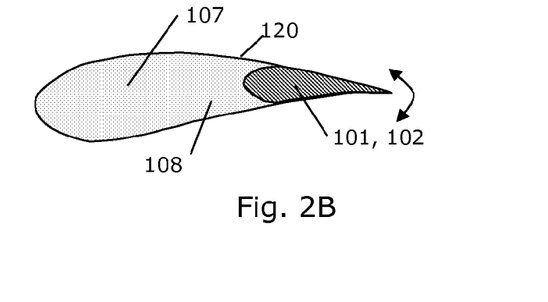
Figure 2C:
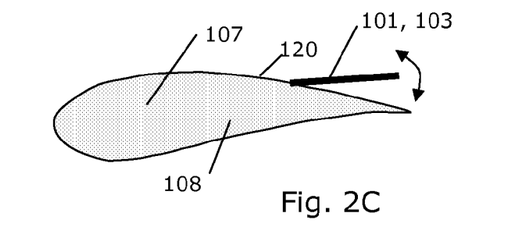

In order to obtain the desired regulation of the blades, the flaps or active trailing edges often extend over considerable lengths of the blade (as also shown in the FIG. 1). The aerodynamic devices 101 are traditionally actuated or moved (rotated, translated, or combinations thereof) in a chordwise plane 108 transverse to the length 106 of the blade. This is illustrated in the FIGS. 2A, B, and C for different types of a slotted flap 109, an active trailing edge flap 102, and an aileron 103, respectively which are all movably connected to the blade body 107. The chordwise plane 108 here and in the following is used to describe a cross sectional plane transverse but not necessarily perpendicular to the longitudinal direction 106 of the blade.

As mentioned in the introduction, the known systems of movable aerodynamic devices usually use hinges for example trailing edge flaps. The very long and relatively flexible structures of most modern wind turbine blades undergo large deformations even during normal operation of the wind turbine. For hinged devices the combination of longitudinal bending and flap movement can open up clearances and cause noise in the context of a wind turbine blade. Therefore trailing edge devices for wind turbine blades may often involve continuous skins deflecting in the chordwise direction. However the combination of longitudinal deflection and chordwise deflection of most types of modern wind turbines may be incompatible and demand undesirable stretching of the skin and very high forces. In some cases continuous skin devices might be difficult to actuate and control effectively under operation of the wind turbine just as the power consumption during operation is higher.

Figure 3:
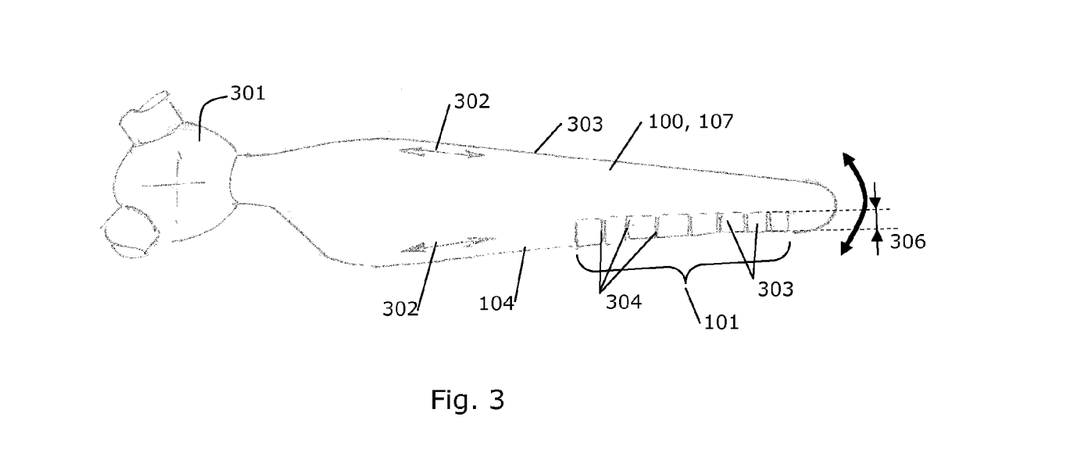
FIG. 3 is a sketch of a wind turbine blade as subjected to edgewise gravity loads and comprising a movable trailing edge with a number of device segments according to the invention.
Figure 4:
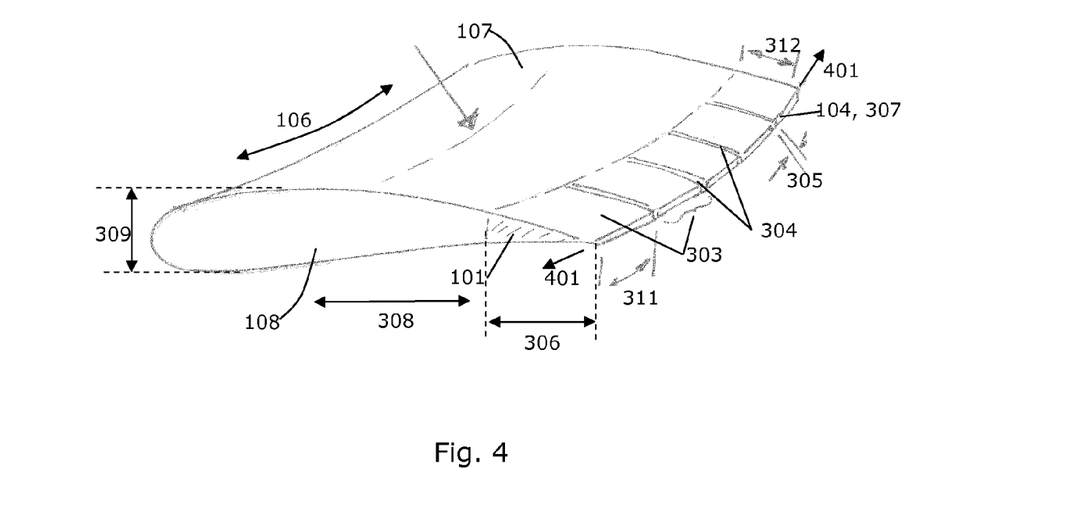
FIG. 4 shows a sketch of a wind turbine blade as subjected to lengthwise bending deformation due to wind pressure and comprising a movable trailing edge with a number of device segments according to the invention.

In FIG. 3 is sketched a wind turbine blade 100 mounted to a hub 301. The gravity loads imposes large edgewise loads on the blade resulting in large compression and tension strains along the leading 303 and trailing 104 edges as illustrated by the arrows 302. The sign of the strains naturally reverse during the rotational cycle of the blade. Likewise, as illustrated in FIG. 4, the longitudinal bending of the blade both during and out of operation due to the wind loads also result in large bending strains 401 in the longitudinal direction 106 of the blade. Further, depending on the present load situation on the entire blade, the blade also flexes and twists to some extent down its length resulting in a varying complex three-dimensional stress and strain state.

However, the operation ability of the different devices 101 for modifying the aerodynamic surface or shape of the blade 100 is highly improved by dividing the devices into a number of sections or segments 303 in the longitudinal direction 106 of the device. These chordwise cuts between adjacent sections or segments present minimum interference to the flow direction and minimise drag and noise. This construction is illustrated in the FIGS. 3 and 4 for an active trailing edge flap 102. For clarity the specific movable connection of the flap and the actuation mechanism is not shown. The aerodynamic device 101 according to the invention which may for instance comprise a movable trailing edge, a flap, and/or an aileron, comprises a number of sections 303 divided by interstices or connecting portions 304. These interstices or connecting portions 304 have higher elasticity than the device sections 303 whereby the overall longitudinal bending flexibility of the device is increased reducing the strains both from the edgewise and bending loads. In the embodiments of the device shown in FIGS. 3 and 4, the interstices 304 are open gaps of a certain width 305 allowing for the sections to deform relative to each other with no contact or little contact between the sections.

The interstices 304 or connecting portions may as illustrated in FIGS. 3 and 4 extend the whole way through the chordwise width 306 of the device or may alternatively extend only a certain portion such as e.g. 70-90% through the chordwise width 306 of the device from the device trailing edge 307 towards the blade body 107 and in the chordwise direction 308. Likewise, the interstices 304 or connecting portions may extend entirely or partly through the thickness 309 of the device 101.

In one embodiment of a device for modifying the aerodynamic surface or shape of the blade the device is divided into sections of lengths 311 between 50-600 mm, preferably between 100 mm and 250 mm. In embodiments the chordwise widths 312 of the interstices 304 or connecting portions are 50-100% of a device width 306 between 50-400 mm, preferably between 200-300 mm. For comparison wind turbine blades may at present be up to 80 m long or longer and may have chord widths up to 6 m in the root section. Similarly trailing flaps may of present be up to 30 m or longer covering around 10-40% of the blade length.

In the embodiments shown in FIGS. 3 and 4, the device 101 is a trailing edge flap which is attached to the blade body 107. As can be seen most clearly in FIG. 4, the flap 101 is connected to a trailing edge of the blade body and a trailing edge of the flap then forms a part of the trailing edge of the blade itself. The flap deflects relative to the blade body and the trailing edge of the blade body is the rearmost edge of the blade body in the downwind direction. The flap 101 has a pressure skin and a suction skin and the cuts extend between the pressure skin and the suction skin.

In the embodiments shown in the FIGS. 3 and 4, the interstices 304 are placed at even distances in the longitudinal direction 106 of the blade. The interstices 304 (or connecting portions as shown in later figures) may however also advantageously be unevenly spaced, for instance at smaller intervals in regions of larger deformations.

Figure 5:
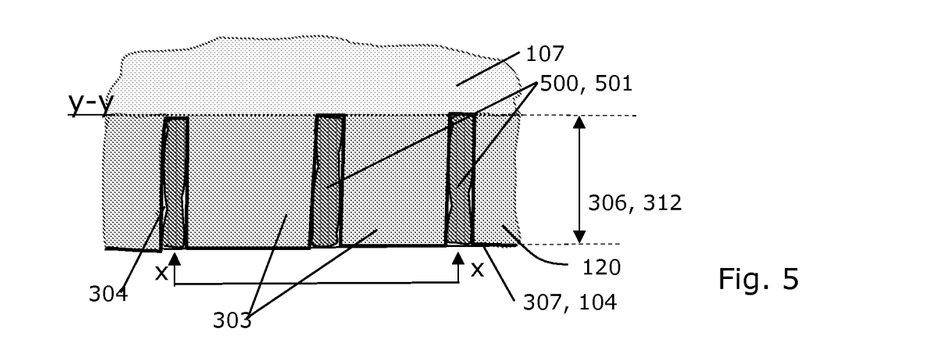
FIGS. 5-6 show an embodiment of a movable trailing edge comprising a number of segments according to the invention as seen from above and from the trailing edge, respectively.
Figure 6:
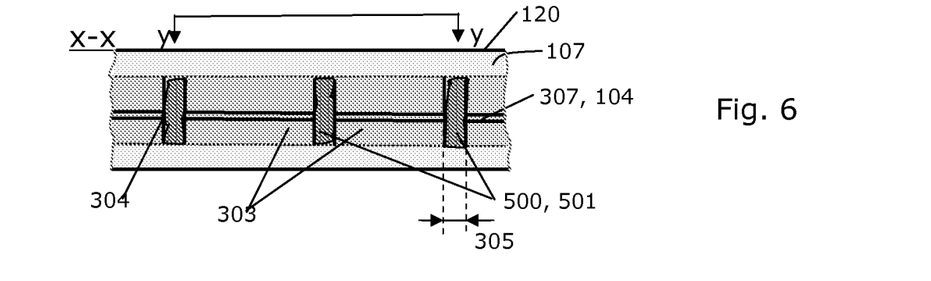

FIGS. 5 and 6 show a selective enlargement of a part of a blade body with a device 101 for modifying the aerodynamic surface or shape of the blade according to the invention. In FIG. 5 the blade is sketched as seen from above from the suction side 120 of the blade, and in FIG. 6 the same enlargement is seen from the trailing edge 307, 104 of the device and the blade. In this embodiment the device 101 similarly to the previous FIGS. 3 and 4 comprises a number of sections 303 which however here are separated by connecting portions 500 in that the interstices are fully or partially filled with a filler material 501 of higher elasticity than the sections between the connecting portions. The filler material may advantageously be configured so that the aerodynamic surface 107 or surfaces of the device remain continuous and essentially smooth whereby a fluid flow passing over the device surface will remain essentially undisrupted by the transitions between the segments of the aerodynamic device. The filler material may further be advantageous in acting as a seal to a large extent if not fully preventing dust particles and/or fluid to enter the inner parts of the aerodynamic device 101 and the actuating mechanisms. The lifetime of the control system may hereby be prolonged considerably.

In the embodiment in FIGS. 5 and 6, the filled gaps between the device sections 303 are all of the same constant width 305. However, in another embodiment of the aerodynamic device the gaps or connecting portions 500 may be of different widths allowing in some regions for larger relative deformations of the device sections before contact. The gaps or connecting portions 500 may also be broader e.g. near the trailing edge than closer to the central part of the blade body.

Figure 7:
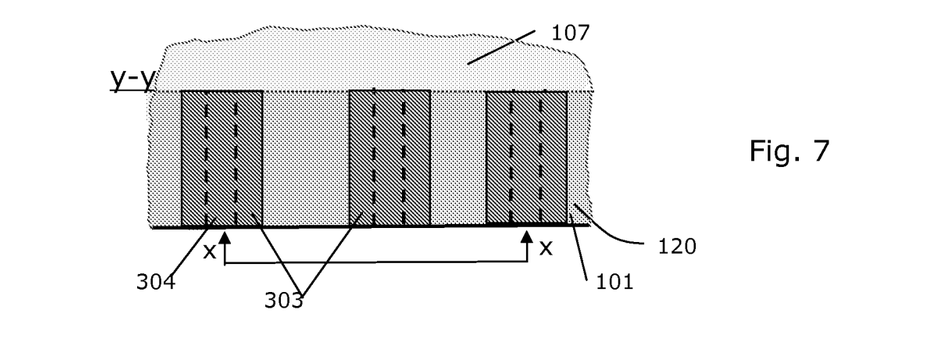
FIGS. 7-8 show another embodiment of a movable trailing edge according to the invention comprising a number of segments sealed by the use of an elastic skin as seen from above and from the trailing edge, respectively.
Figure 8:
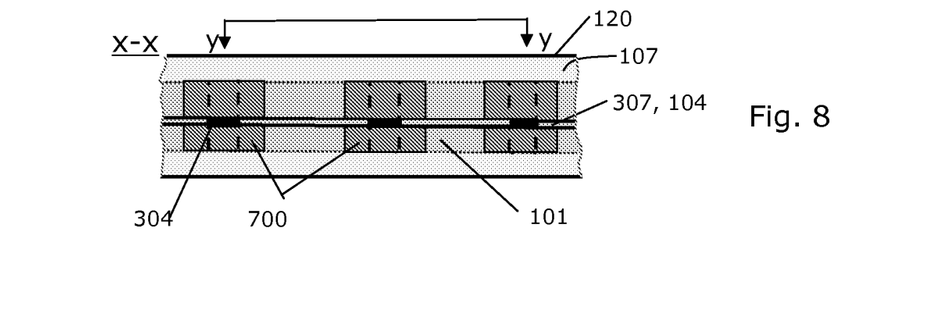

In the FIGS. 7 and 8 is shown another embodiment of a device 101 for modifying the aerodynamic surface or shape of the blade where the continuous device surface is obtained by covering the interstices 304 or connecting portions 500 with an elastic film 700. As for the previous figures, the enlargements of the device are shown from above (FIG. 7) and from the trailing edge (FIG. 8), respectively. The device may also be fully embedded or covered by the elastic film 700.

Figure 9:
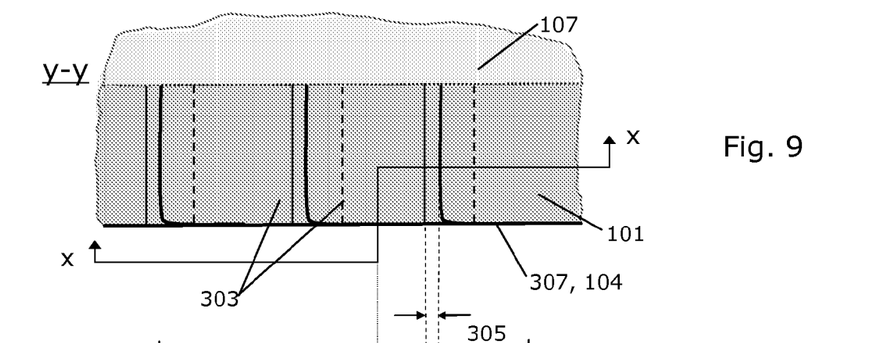
FIGS. 9-10 show an embodiment of a movable trailing edge comprising a number of overlapping segments according to the invention as seen from above and from the trailing edge, respectively.
Figure 10:
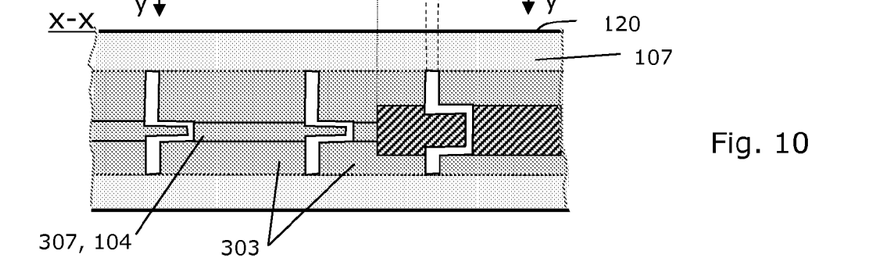

In a further embodiment of the invention, the device 101 for modifying the aerodynamic surface or shape of the blade may comprise a number of sections 303 which overlap as in the example shown in the FIGS. 9 and 10 as seen from above and from the trailing edge, respectively.

Figure 11:
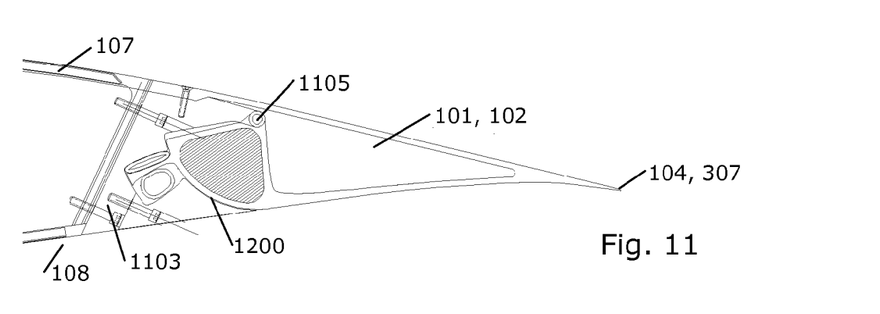
FIGS. 11-12 show an embodiment of an active trailing edge being controlled by pressure, and as seen in two different positions.
Figure 12:
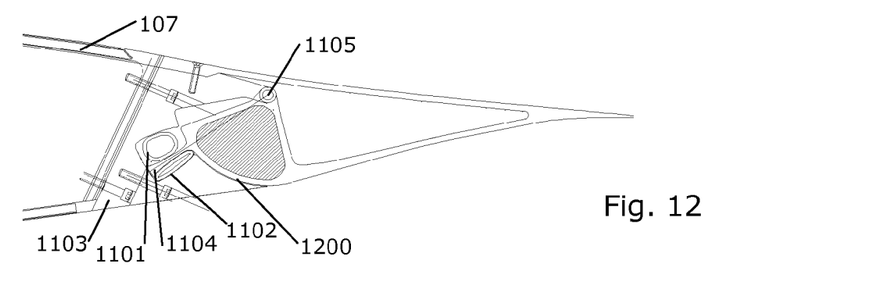

In the FIGS. 11 and 12 is shown an embodiment of an active trailing edge in two different positions corresponding to its fully deactivated and fully activated state, respectively. Here, two hoses 1101, 1102 are provided which run along the span of the blade 101 inside the rigid attachment element 1103 that is connected to the blade body 107. A lever element 1104 which is attached to a hinge 1105 is provided between the two hoses 1101, 1102. As seen in FIG. 11, the first hose 1101 is depressurised as a vacuum has been applied to it, and the second hose 1102 has been pressurized resulting in the trailing edge flap 102 being held in its lowermost position. In FIG. 12, the first hose 1101 is now pressurised and the second hose 1102 is depressurised causing the lever element 1104 between the two hoses to move which in turn causes the trailing edge flap 102 to move around the hinge 1105. The two hoses 1101, 1102 may run along parts of or the entire length of the trailing edge flap 102 and hereby control some or all of the sections of the trailing edge flap. If the hoses are indirectly connected to each of the sections of the aerodynamic device, all parts of the trailing edge flap may be controlled uniformly. Alternatively, several systems of pressure hoses may be applied on different parts of the trailing edge flap allowing the flap movement to be e.g. gradually increasing from its one end to the other, or allowing different parts of the device to be controlled and moved independently and individually etc. Pressure chambers or bladders may also be used in place of the pressure hoses.

In another embodiment of the activation mechanism, the trailing edge flap 102 is connected to the blade body 107 by means of flexible connection joint around which the flap 102 rotates.

A radial surface 1200 with its center in the rotation hinge 1105 is provided to enable the flap 102 to move while maintaining the continuity of the blade surface when the flap is actuated. In another embodiment, the flap 102 may be a deformable trailing edge and may be connetted to the blade body 107 by means of a flexible and/or elastic connection at both the suction skin and the pressure skin, so that the radial surface 1200 and the hinge 1105 are not required.

It is to be understood that the devices for modifying the aerodynamic surface or shape of the blade according to the present invention may equally well be actuated or controlled by other activation mechanisms such as by different types of actuators (for instance hydraulic, pneumatic, electromagnetic, piezoelectric, or mechanical actuators), or by for instance internal pressure chambers and as known by persons skilled in the art. Further, all device sections may according to the invention be controlled and regulated uniformly or individually or by gradually varying regulation.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A wind turbine blade comprising:
 a blade body extending in a longitudinal direction from a root portion to a tip portion and defining an aerodynamic airfoil cross section extending in a chordwise direction transverse to the longitudinal direction,
 one or more devices for modifying the aerodynamic surface or shape of the blade in an area of a portion of the trailing edge of the blade, and
 one or more activation mechanisms for controlling the position and/or movement of said device; said device being movably connected to the blade body and being at least partly divided into a number of sections by interstices or connecting portions having higher elasticity than said sections, the interstices or connecting portions extending at least partly through a thickness of the device from a trailing edge of said device and in said chordwise direction, such that the overall longitudinal bending flexibility of the device is increased,
 wherein the blade body has a trailing edge and the device is attached to the trailing edge of the blade body, said device being a trailing edge flap and a trailing edge of the flap forms at least part of the trailing edge of the wind turbine blade,
 wherein said trailing edge flap comprises a pressure skin and a suction skin and the interstices or connecting portions extend through a thickness of the flap between the pressure skin and the suction skin, and
 wherein a first one of the pressure and suction skins is secured to or integral with the blade body, and a second one of the pressure and suction skins is slidably movable with respect to the blade body.

2. The wind turbine blade according to claim 1 where said interstices are arranged at essentially even intervals along the longitudinal direction of said device.

3. The wind turbine blade according to claim 1 where said interstices or connecting portions extend through the entire chordwise width of said device.

4. The wind turbine blade according to claim 1 where said one or more connecting portions comprise an elastic filling material formed from at least one of an elastomeric material, a plastic foam material, an inflated seal, or a stretched elastic skin.

5. The wind turbine blade according to claim 4 where said elastic filling material is configured to form an essentially smooth surface of said device.

6. The wind turbine blade according to claim 1 where said one or more devices for modifying the aerodynamic surface or shape of the blade comprise one or more elastic films at least partly covering said interstices or connecting portions.

7. The wind turbine blade according to claim 1 wherein neighboring device sections at least partly overlap in the relaxed state of the blade.

8. The wind turbine blade according to claim 1 where said activation mechanisms for controlling the position and/or movement of said devices comprise an actuator and/or a pressure chamber.

9. The wind turbine blade according to claim 1 where said activation mechanisms for controlling the position and/or movement of said devices comprise at least one pressure hose positioned essentially in the longitudinal direction of said device.

10. The wind turbine blade according to claim 1, wherein a part of the second one of said pressure and suction skins being slidably movable with respect to the blade body comprises a radial surface arranged such that it is rotatable about a hinge.

11. A wind turbine comprising at least one wind turbine blade according to claim 1.

12. A wind turbine blade, comprising:
 a blade body extending from a root portion to a tip portion and defining an aerodynamic airfoil cross section extending from a leading edge to a trailing edge,
 a trailing edge flap movably connected to the trailing edge of the blade body for modifying an aerodynamic surface or shape of the blade, the trailing edge flap including a pressure skin and a suction skin and being at least partly divided into a plurality of sections by interstices or connecting portions having higher elasticity than said sections, the interstices or connecting portions extending through a thickness of the flap between the pressure skin and the suction skin, such that the overall longitudinal bending flexibility of the device is increased, and
 one or more actuators for controlling the position and/or movement of said trailing edge flap,
 wherein a first one of the pressure and suction skins is secured to or integral with the blade body, and a second one of the pressure and suction skins is slidably movable with respect to the blade body upon activation of one or more of said actuators.

13. The wind turbine blade according to claim 12 where said connecting portions comprise an elastic filling material that completely fills the space between adjacent sections and forms an essentially smooth surface with the pressure and suction skins of the adjacent sections.

14. The wind turbine blade according to claim 12 where said connecting portions comprise an elastic film extending across the interstice between adjacent sections and being connected to the pressure and suction skins of adjacent sections.

\* \* \* \* \*